June 9, 1931.  A. S. MACKENZIE  1,809,520
COTTON BALING MACHINERY
Filed Sept. 30, 1925    5 Sheets-Sheet 1

Fig. 1.

Inventor
A. S. Mackenzie,
By Cushman, Bryant & Darby
Attorneys

June 9, 1931.  A. S. MACKENZIE  1,809,520
COTTON BALING MACHINERY
Filed Sept. 30, 1925     5 Sheets-Sheet 2

Patented June 9, 1931

1,809,520

UNITED STATES PATENT OFFICE

ALEXANDER S. MACKENZIE, OF HOUSTON, TEXAS, ASSIGNOR TO CLAYTON GIN COMPRESS COMPANY, OF HOUSTON, TEXAS, A CORPORATION OF TEXAS

COTTON BALING MACHINERY

Application filed September 30, 1925. Serial No. 59,566.

This invention relates broadly, to winding and unwinding devices, and more particularly to bat accumulators for use in connection with the baling of cotton.

An important object of the invention is to provide an improved bat accumulator, from which the rolled bat may be removed directly from the accumulator in bulk, without stopping the condenser and bale former and without the necessity of running the bat back into the usual bale former. Heretofore it has been found necessary, when it is desired to remove the remnant bat from the accumulator, to stop the bale former and condenser in order to run the accumulated bat back into the bale former, which necessitates a loss of time in the baling operations, and it is therefore the primary object of this invention to eliminate this loss of time.

Another important object of the invention resides in the provision of an accumulator of the above description with which it is also possible, when it is desired to remove the remnant bat from the accumulator, to run this accumulated bat back into the bale former, separtely or along with the bat coming from the condenser.

A still further important object of the invention resides in the provision of an acculmulator of the above description which can be operated so that a remnant bale may be placed in the lower part of the accumulator and unwound to feed the bat into the bale former without exerting any breaking strains on the tenuous fibrous material.

A still further object of the invention is to associate this improved accumulator with a bale former and condenser in such a manner that the accumulator can be driven from the condenser mechanism in either direction to wind or unwind the bat in the accumulator. This arrangement also makes it possible to associate with this combination a bat guide and control mechanism, which when arranged in one position causes the delivery of the bat to the accumulator and causes taking-up action of the accumulator, and when moved into another position causes both the guide and accumulator to feed the bat to the bale former.

A further object of the invention resides in the provision of a special accumulator having a baling chamber which is capable of winding material without a core, in order that the wound material may be removed in bulk or in the form of a bale.

Other objects and advantages of the invention will become apparent during the course of the following description.

Referring now to the drawings, wherein for the purpose of illustration is shown the preferred embodiment of my invention, and wherein like numerals are employed to designate like parts throughout the several views.

Referring more particularly now to the drawings, the numeral 10 designates the usual form of round bale former or press, such as is disclosed in Patent No. 1,257,798, granted to Brown, on February 26, 1918. It is not beleived that a detailed description of this type of bale former or press is necessary as the invention does not reside in the construction thereof. Suffice it to say that this type of press usually includes a hinged roll carrying section which may be opened to remove the formed bale therefrom.

A condenser mechanism indicated in general by the numeral 11 is supported in elevated position by means of vertical upright channel irons 12 and cross beams 13 and 14, the latter extending beyond the uprights 12 to rest upon and to be secured to the top of the bale former or press 10. As is customary, condenser or bat forming rolls 15 are mounted within the condenser housing directly above a lint slide or chute 16 which is inclined downwardly and toward the throat of the bale former 10 in the usual manner. This lint slide is provided with sides to form a trough and to prevent displacement of any of the bat going down the same. A section of the bottom or floor of this slide 16, adjacent the bale former is formed into a bat chute 17 by connecting the upper edge of the bat chute to a shaft 18 journaled transversely of the lint slide 16. To one end of this shaft 18, beyond the side of the lint slide, is secured a lever 19 having at its free end an outwardly extending projection or pin 20 for a purpose which will be presently described.

Figure 3:
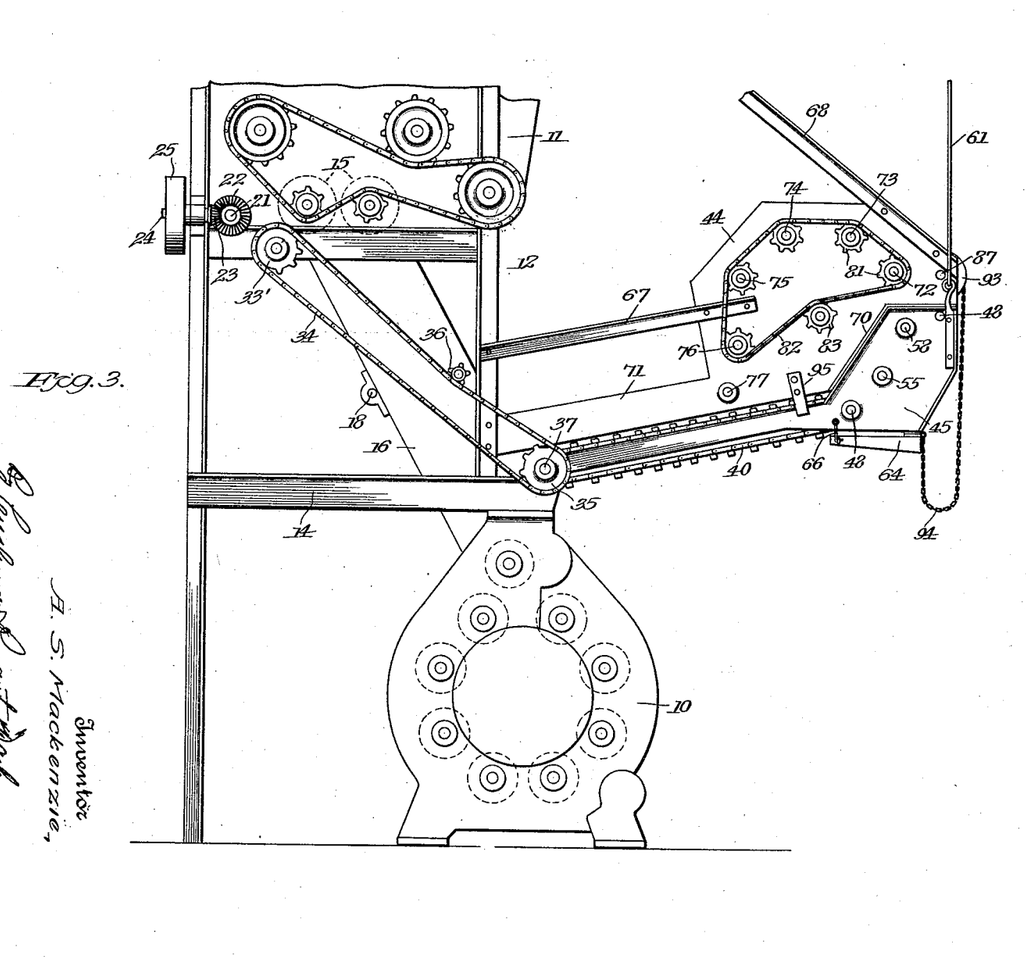
Figure 3 is a side elevation of the opposite side of the mechanism, showing the accumulator closed and in a position to either wind or unwind the cotton bat.

A power shaft 21 is journaled in bearings on the side beams 13 to extend transversely of the condenser and on one end of this shaft, as shown in Figure 3, is keyed a bevel gear 22 adapted to mesh with a corresponding gear 23 fixed to a counter shaft 24 journaled on the condenser frame and deriving power from a pulley wheel 25. The other end of the power shaft 21 has fixed thereto a gear 26 which is adapted to mesh with an idler 27 mounted on the side of the condenser frame, as shown.

A power transmitting shaft 28 is journaled transversely through the side beams 13 and to the end of this shaft on the same side of the machine as the idler 27 is secured a gear 29. Pivotally mounted on this same end of the shaft 28 is an elongated operating lever 30, the fulcrum end of which is provided with an axle to rotatably mount a rumbler gear 31 which is adapted to mesh with either the gear 27 or gear 26, depending upon the position of lever 30. In order to form a connection between the levers 19 and 30, a hook or latch 32 is pivotally connected to the lever 30, as at 33, and the other end of this latch is provided with a notch adapted to engage with the pin 20 of lever 19 so that upon downward movement of lever 30 the lever 19 and lint chute 17 will fall by gravity in the same plane with the bottom of the lint slide 16 so that the cotton bat from the condenser will be directed to the bale former.

The other end of shaft 28 on the other side of the machine as shown in Figure 3 has connected thereto a sprocket 33' with which is engaged a sprocket chain 34 which also passes around a sprocket 35. The upper run of the sprocket chain 34 passes beneath an idler 36, as clearly shown in Figure 3.

Figure 1:
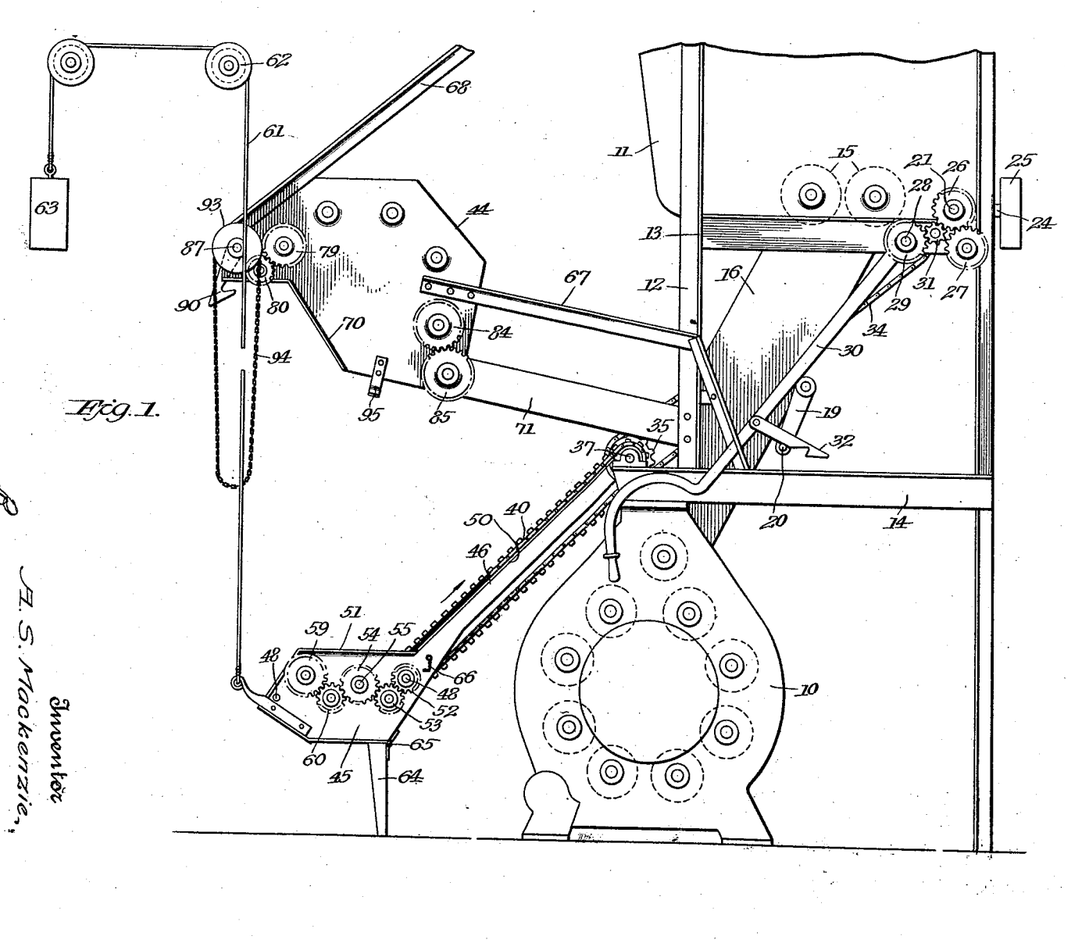
Figure 1 is a side elevation of the mechanism with the parts in position to feed the cotton bat to the bale former, the lower section of the improved accumulator being lowered and in position to permit of unwinding a remnant bale to feed the bat therefrom into the bale former.
Figure 2:
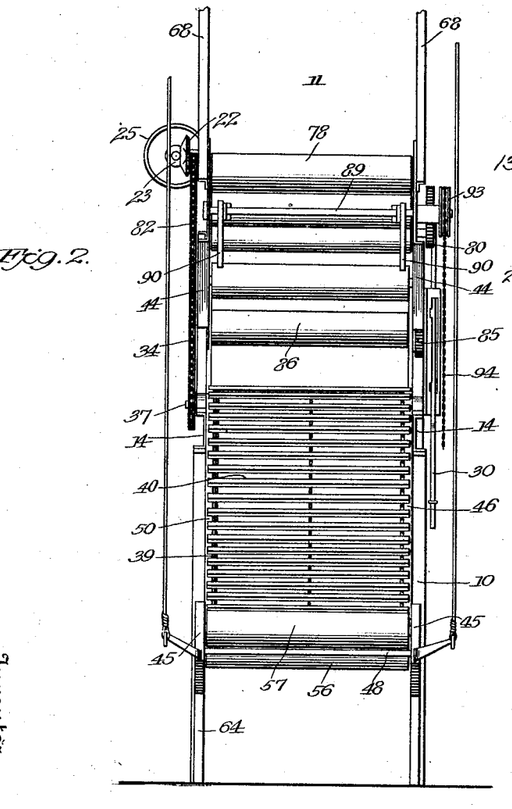
Figure 2 is a front elevation of Figure 1.

This sprocket 35 is keyed to one end of a shaft 37 journaled in bearings mounted on top of the beam extensions 14 which are attached to the top of the bale former. This shaft 37 is provided with a plurality, preferably three, of smaller sprockets 38 adapted to drive the chains 39 of the endless apron 40 which is provided with spaced transverse slats 41, as best seen in Figures 1 and 2.

My improved accumulator which permits of the removal of the bat in bulk therefrom, when desired, is designated in its entirety by the numeral 42 and consists essentially of a baling chamber 43, which is composed of a pair of sections 44 and 45.

The lower section 45 of the accumulator is essentially the same as the remnant bale device disclosed in my United States Letters Patent No. 1,723,245, granted August 6, 1929, and consists of a frame having spaced parallel side bars 46. The inner or upper ends of these side bars are pivotally mounted upon the shaft 37 outside of the small sprockets 38 which carry the apron chains. The outer ends of these side bars have fastened thereto large angularly disposed side members or plates 47 which are connected at their outer ends and are retained in spaced relation by a transverse rod 48 passing therethrough.

Figure 5:
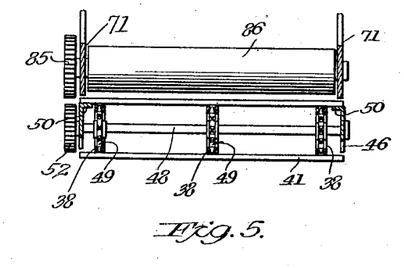
Figure 5 is a transverse section on the line 5—5 of Figure 4, looking in the direction of the arrows.
Figure 6:
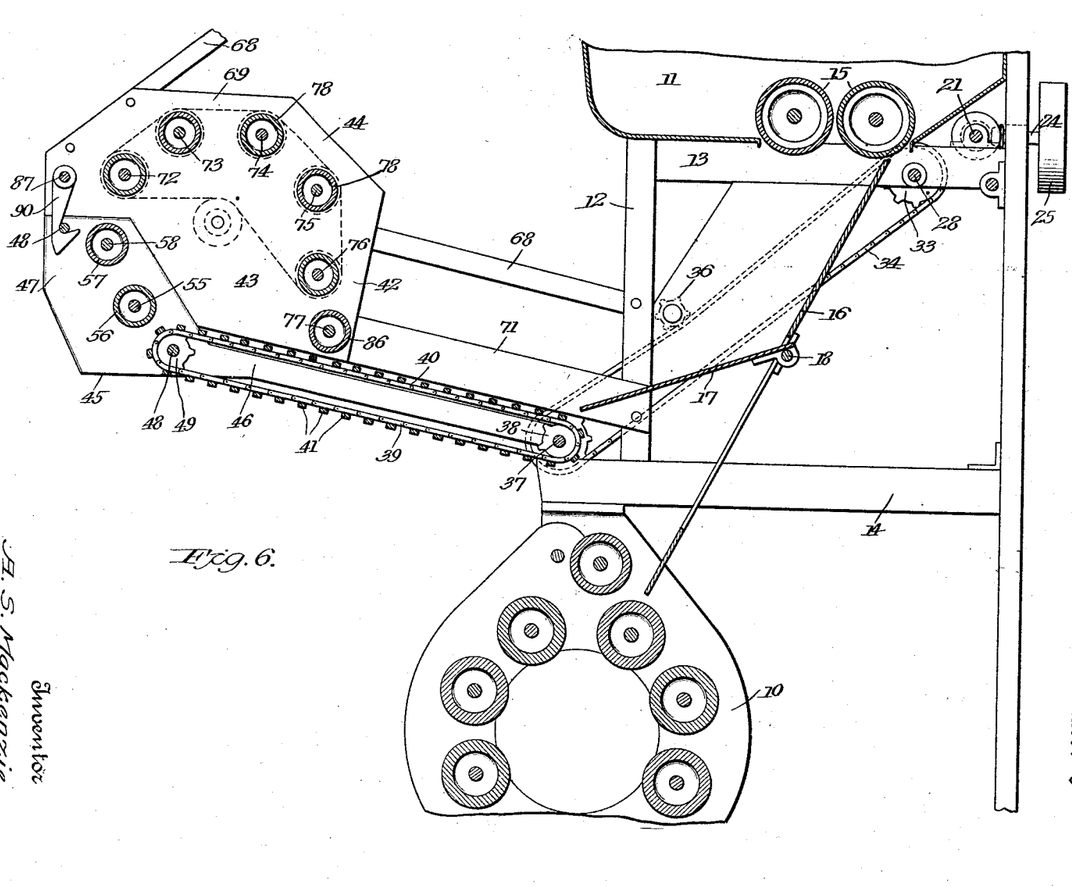
Figure 6 is a longitudinal sectional view of Figure 4.

Journaled in the plates 47 to extend transversely of this accumulator section is a shaft 48 disposed substantially at the juncture of the side plates 47 with the side bars 46, and upon this shaft are mounted a number of sprockets 49 corresponding to the number of sprockets 38. Around these sprockets 49 are trained endless chains 39 forming a part of the endless apron 40, and it will be observed in Figure 5 that the upper marginal edges of the side beams 46 are provided with inwardly extending flanges 50, upon which ride the ends of the slats composing the apron. Likewise, the relative upper marginal edges of the side plates 47 are provided with outwardly extending flanges 51 for a purpose which will be later described.

Keyed to the extended end of the shaft 48 is a gear 52 adapted to mesh with an idler 53 which in turn drives a gear 54 mounted on the end of a roll shaft 55 journaled transversely through the side plates 47. Upon this shaft, between the side plates, is secured a baling roll 56, and a similar roll 57 is keyed to a shaft 58 also journaled in the side plates 47, and which has connected to its extended end a gear 59 which is driven from gear 54 by means of an idler 60. From this arrangement, it will be apparent that rotation of the baling rolls 56 and 57 is effected by the movement of the endless apron 40 and idler gears 53 and 60.

It will also be apparent that this lower section 45 of the accumulator is capable of vertical swinging movement about the shaft 37 as an axis. When this lower section is moved downwardly its weight is counterbalanced by means of cables 61 being attached thereto and guided over sheave wheels 62 and having weights 63 attached thereto.

Figure 4:
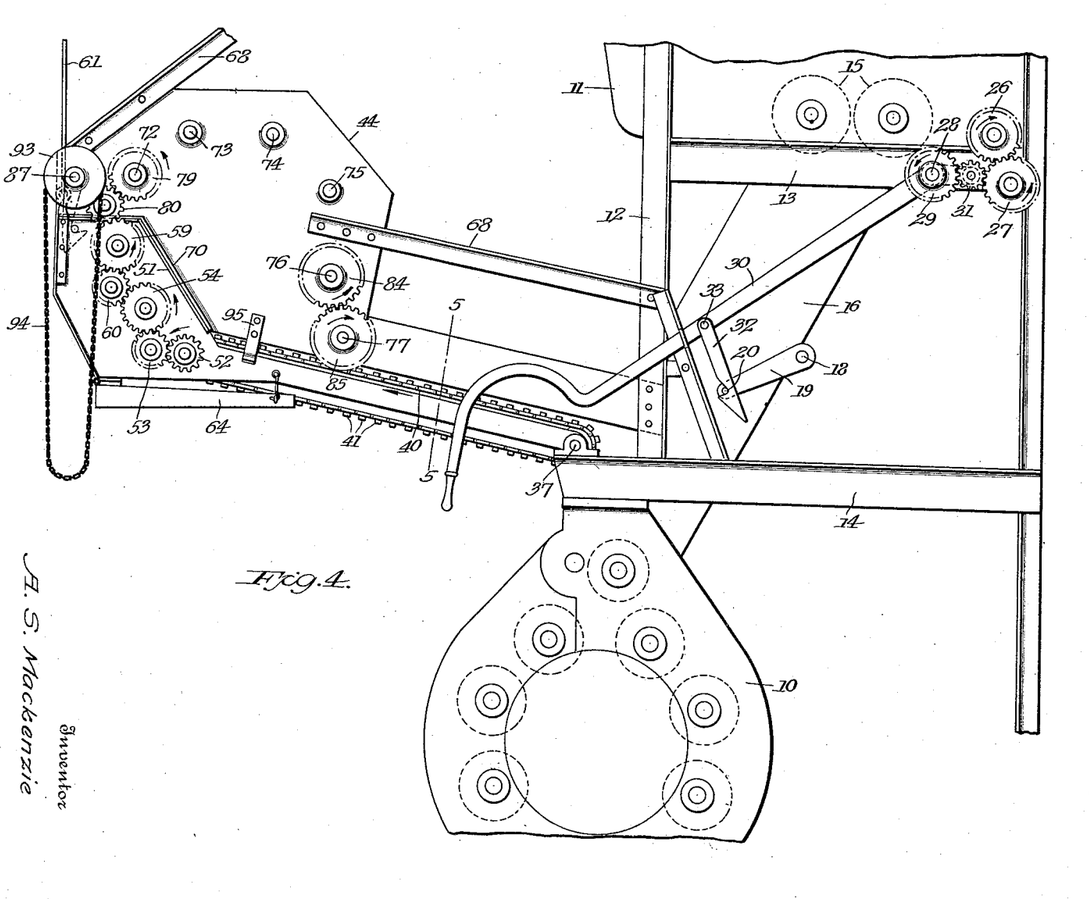
Figure 4 is an enlarged side elevation of the side of the mechanism shown in Figure 1 with the parts in position to cause the bat from the condenser to be fed into the accumulator.

In order to support this lower accumulator section 45 in its lowermost position and inclined with respect to the bale former, a pair of feet or legs 64 are hingedly connected, as at 65, to the frame and are retained in inoperative position, as shown in Figure 4, by means of the hooks 66. When, however, the use of the legs is desired for the support of the lower section of the accumulator, the hooks 66 are unfastened and the legs permitted to swing by gravity until they come into engagement with the floor.

The upper section 44 of the accumulator is, in the present instance, disclosed as being stationary and supported in elevated position upon the condenser frame by means of channel irons 67 and 68 being bolted thereto and to the accumulator section as shown. This upper accumulator section likewise consists of a pair of spaced side plates 69 which form the sides of the baling chamber 43 heretofore referred to. The lower edges of these two plates conform to the configuration of the upper edges of the lower accumulator section and are provided with outwardly extending marginal flanges 70 adapted to fit against the flanges 50 and 51 of the lower accumulator section 45. These two side plates 69 of the upper section are supported principally by a pair of spaced parallel side beams 71 which are bolted to the uprights 12 of the condenser frame. When the two accumulator sections are in closed position, it will be seen from Figure 5 that these beams 71 form sides of a trough, the bottom of which is constituted by the endless apron 40. A plurality of transverse roll shafts 72, 73, 74, 75, 76 and 77 are journaled transversely in the side plates 69 of the upper accumulator section, and each of these shafts between the side plates have secured thereto a baling roll 78. It will be noted that these shafts are arranged in substantially an arc of a circle, and together with the baling rolls 56 and 57, form substantially a circular baling chamber. One end of the shaft 72 is provided with a gear 79 which meshes with an idler 80 mounted upon the side plate 69 and adapted to mesh with the gear 59 of the lower accumulator section. The other end of this shaft 72 is provided with a sprocket 81 and likewise corresponding ends of the shafts 72, 73, 74, 75 and 76 are each equipped with a sprocket wheel adapted to have trained thereover a sprocket chain 82 whereby all of the baling rolls mounted on the shafts are rotated in the same direction. This sprocket chain 82 passes over an idler sprocket 83 mounted on the outside of one of the side plates 69, as shown clearly in Figure 3.

The end of the shaft 76, opposite the sprocket thereon, has connected thereto a gear 84 which is adapted to mesh with a corresponding gear 85 keyed to the end of shaft 77 so that this shaft is rotated in the opposite direction from the shafts carrying the baling rolls 78. Upon this shaft 77, between the side plates 69 of the upper accumulator section, is mounted a feeding roll 86 which is arranged just slightly above the endless apron 40 when the accumulator sections are closed so that it will assist in feeding the bat coming up the apron into the accumulator baling chamber.

Figure 7:
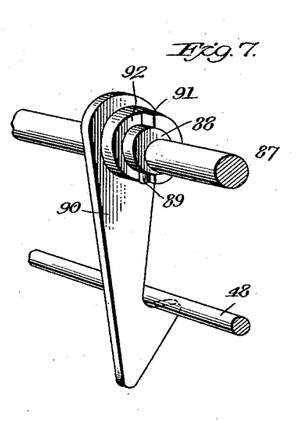
Figure 7 is an enlarged perspective view of the latch mechanism for holding the accumulator sections in closed position.
Figure 8:
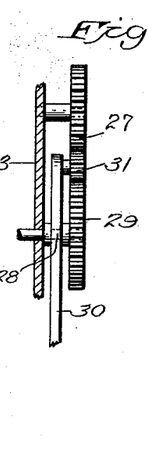
Figure 8 is a fragmentary plan of the upper end of the operating lever.

In order to retain the lower accumulator section 45 in elevated position and closed, with respect to the upper section 44, the latter is provided with a transverse shaft 87 which is journaled in the extreme outer ends of the plates 69 and is provided adjacent each side of the upper section with an eccentric 88. The lower portion of each eccentric is provided with an outwardly extending pin 89, as clearly shown in the detailed view of Figure 7. A depending hook 90 is provided with a laterally extending sleeve 91, half of which, as shown at 92, is removed to form a pair of diametrically arranged stop shoulders, as shown. Each hook 90 has its sleeve portion 91, mounted upon its respective eccentric 88 so that the pin 89 is arranged within the cut away portion 92 of the sleeve. The lower ends of these hooks are adapted to engage under the rod 48 carried by the lower accumulator section to retain the same in engagement with the upper accumulator section.

In order to actuate the hooks 90 and to release them from or engage them with the rod 48, the shaft 87, at one end, is provided with a sheave wheel 93, over which is trained an endless operating chain or cable 94. When the accumulator sections are closed, as in Figure 4, and it is desired to release and lower the accumulator section 45, the chain 94 is actuated to turn the shaft 87 so that the eccentrics 88 will rotate to first lower the hooks 90 after which the pins 89 will have engaged the shoulders of the sleeve to cause the hooks to move outwardly from the rod 48. As soon as the hooks have been released, the lower accumulator section 45 may descend, the weight thereof being counter-balanced by the weights 63. After the lower accumulator section 45 has been elevated to a point to close the accumulator, the chain 94 is actuated to cause the hooks 90 to first move inwardly beneath the rod 48 and then upwardly to engage under the same to lift and securely hold the lower section in an elevated position.

In order to cause the two sections of the accumulator to close upon on another properly, the upper section thereof has bolted to opposite sides thereof, downwardly projecting guide plates 95 which extend beyond the lower edge of the upper section and are slightly curved outwardly at their ends so as to engage with the sides of the lower section to guide it properly into engagement with the upper section. These guide plates also serve to steady the lower section of the accumulator when it is in closed position since they act to prevent any tendency toward lateral movement thereof, during the operation of the accumulator.

The operation of the mechanism is as follows:

Assuming that it is desired to bale cotton in the bale former 10, and the parts are in the positions shown in Figure 4, with the ginning machinery and condenser rolls in constant operation feeding the cotton bat downwardly to the lint slide 16, the lint chute 17 is arranged in its lowermost position and in the same plane with the bottom of the lint slide so that the cotton bat is fed directly into the bale former 10 in the customary manner. In this position of the bat chute 17, the operating lever 30 will be in its lower position to engage the rumbler gear 31 with the power gear 26 which, through the intermediacy of the sprocket chain 34, will drive the apron 40 of the conveyor so that the upper run thereof will move toward the bale former 10. After the bale of cotton in the bale former 10 has been wound and the bagging or wrapper has been placed thereon, the operating lever 30 is raised so as to cause the hook 32 to engage the pin 20 of lever 19 and raise the bat chute 17 to a position shown in full lines in Figure 4 so that the cotton bat coming down the lint slide will be directed by the bat chute on to the apron 40 of the accumulator instead of into the bale former. While the completed bale is being removed from the bale former in the customary manner and the former is being made ready to form another bale, the cotton bat is fed by the apron 40 into the chamber of the accumulator and is wound into a roll by means of the baling rolls mounted upon the two sections of the accumulator. It will be observed that during this phase of the operation of the machinery the parts are moving in the direction of the arrows in Figure 4, it being observed that the direction of rotation of the roll 86 of the upper accumulator section is opposite to that of the baling rolls of the accumulator so as to cooperate with the apron 40 in feeding the cotton bat into the baling chamber of the accumulator. It is, of course, appreciated that during this operation the ginning and condenser mechanisms are continuously operating so that it is unnecessary to stop the machinery while the completed bale is being removed from the bale former or in case it is desired to remove the remnant bale from the accumulator.

When the bale former 10 is again ready to receive the cotton bat to form a new bale, and should it be desired to return the accumulated cotton in the accumulator back into the bale former together with the cotton bat coming from the condenser rolls, the operating lever 30 is moved downwardly to lower the hook 32 and bat chute 17, and simultaneously with such action, the rumbler gear 31 is moved out of engagement with the gear 27 and into engagement with gear 26, which causes the apron 40 of the accumulator to feed into the bale former and the movement of the accumulator baling rolls in directions opposite to the arrows in Figure 4 so that the accumulated roll of bat in the accumulator is unwound, and fed into the bale former together with the bat coming from the condenser rolls 15. Due to the fact that the accumulated roll of bat is positively unwound and the bat therefrom positively fed by the apron 40, it will be appreciated that no breaking strains are exerted upon the bat as it is being fed into the bale former.

Assuming the parts to be in the positions illustrated in Figure 4, with a remnant bale wound in the accumulator chamber, and it is desired to remove this remnant bale in bale form therefrom, without interrupting the baling operation of the bale former and the gin; the cotton bat going to the accumulator can be severed in any suitable manner, after which the hook 32 is swung on its pivot 33 to cause disengagement with the pin 20 of lever 19, thereby permitting the bat chute to drop without reversing the movement of the apron 40 of the accumulator whereby the cotton bat coming from the condenser will then be fed directly into the bale former. If desired, a piece of bagging or wrapper can be wound around the remnant bale in the accumulator by introducing the bagging between the baling rolls of the lower accumulator section, and due to the fact that all of the bailing rolls are rotating in the direction of the arrows in Figure 4, it will be seen that the bagging will be wrapped around the remnant bale. While the baling is being performed in the bale former 10, the remnant bale in the accumulator can be removed from the mechanism by simply actuating chain 94 to disengage the latches 90 from the rod 48 in the manner heretofore explained, at which time the lower accumulator section will move slowly downward by gravity, it being recalled that the counter balance weight 63 will prevent rapid descent of this section. As the lower section approaches the floor, the hooks 66 will be disengaged from the feet 64, permitting them to swing to vertical positions to engage with the floor and support the lower section in the position shown in Figure 1. During the descent of the lower accumulator section the remnant bale is supported upon the baling roll 57 and outer end of the apron 40, and after this section has reached its lowermost position, the remnant bale can be removed and stored.

When the lower accumulator section 45 is in the position shown in Figure 1, it may be found desirable to take a remnant bale from storage and place it in this section to feed it into the bale former 10 to be run into a complete bale. This condition may arise when the bale former is already operating to form a bale with the bat coming from the condenser or it may happen when the bale former is empty. In either event, however, the operating lever is moved downwardly to the position shown in Figure 1 to cause the rumbler gear 31 to engage with gear 26 so that the apron of the accumulator section 45 will move in the direction of the arrow shown in Figure 1. This movement of the apron will cause the two baling rolls 57 and 58 of the lower section to move in a clockwise direction to unwind the remnant bale supported upon the baling rolls and the outer end of the apron 40 in the same manner referred to in my above mentioned application. As the bat is unwound from the remnant bale, it is positively fed upwardly of the inclined apron and into the throat of the bale former 10.

Should it be desired to close the two accumulator sections 44 and 45, the supporting feet 64 are folded up into the closed position and latched by the hooks 66 and the lower section elevated until the flanged edges thereon abut those on the stationary elevated section 44, after which the chain 94 is pulled in the direction to cause the hooks 90 to engage the rod 48 to lock the movable lower section 45 of the accumulator to closed position. During this time, the operating lever 30 may be shifted to a position so that the rumbler gear 31 thereof will be disengaged from both gears 26 and 27 so that the apron 40 and baling rolls of the accumulator are thrown out of operation. Upon moving the lever 30 upwardly to shift the rumbler gear 31 into engagement with the gear 27, the hook 32 will slide over the pin 20 of lever 19 until the notch comes into engagement with this pin and moves the lever 19 upwardly together with the bat chute 17 to the dotted line position shown in Figure 4. If there is no remnant bale in the accumulator, the apron 40 thereof may be permitted to move in the direction of the arrows, as shown in Figure 4, while the operating lever 30 may be swung downwardly upon its fulcrum 28 to cause the bat chute to be lowered and the rumbler gear 31 to be engaged with the gear 26 so that the apron 40 will move in the opposite direction to that shown by the arrow in Figure 4 and the cotton bat from the condenser will be directed into the bale former. When there is a remnant bale in the accumulator and the parts are in the position shown in Figure 4, and it is desirable to maintain the remnant bale in the accumulator while bat is being fed into the bale former 10 from the condenser rolls, the hook 32 may be swung upon its pivot 33 to permit the bat chute 17 to drop to its lowermost position for directing the bat from the condenser rolls directly into the bale former.

With this improved form of accumulator, by which the accumulated cotton is wound into a roll or bale without a core, it will be apparent that at any time desired the remnant bale in the accumulator may be removed therefrom in the manner heretofore specified, without running the bat back into the bale former 10 and without interrupting in any way the operations of the condenser mechanism and bale former. It will also be clear that remnant bales in storage can be rapidly placed in the accumulator and fed into the bale former which is not possible with the present known machinery.

While I have shown a particular construction to illustrate the apparatus for accomplishing the results mentioned, it will be understood that variations which are simply equivalent mechanical expedients may be made without departing from the range or scope of my invention.

I claim:

1. An accumulator for bale formers comprising a pair of sections forming a baling chamber, said sections when closed being adapted to wind or unwind cotton bat, and one of said sections being capable of movement to a positon to operate independently of the other for unwinding cotton bat.

2. An accumulator for bale formers consisting of a pair of sections forming a baling chamber, one section thereof including an endless conveyor operable in either direction and a bale support and being movable to a position to either cooperate with the other section or to a position to operate independently thereof to either wind or unwind material.

3. An accumulator for bale formers comprising a baling chamber consisting of stationary and movable sections, said movable section having means for rotating a bale while independently retaining it on a fixed axis and being operable either conjointly with or independently of the stationary section.

4. An accumulator for bale formers comprising a sectional baling chamber including a movable section, said movable section including an endless apron and a baling roll arranged to form a bale support therebetween, and the other section including baling rolls adapted to co-operate with the roll of the movable section.

5. An accumulator for bale formers comprising a stationary section arranged in an elevated position and having baling rolls, a movable section having a baling roll and an endless conveyor arranged to form a bale support therebetween and adapted to be pivotally mounted to be moved to an open position to operate independently of said stationary section to empty the accumulator and to a closed position to co-operate with the stationary section.

6. An accumulator for bale formers comprising a pair of sections forming a baling chamber, one of said sections having baling rolls, a feeding roll mounted in said section, the other section of said accumulator having an endless apron adapted to co-operate with said feeding roll to feed bat to or from the accumulator.

7. An accumulator for bale formers comprising a sectional baling chamber, one section thereof being movable to open and closed positions, a pair of spaced supports supporting the other section, an endless apron carried by said movable section, and said pair of spaced supports co-operating with the endless apron when the sections are closed to form sides for the endless apron.

8. The combination with a continuously operating power device, a bale former, an accumulator therefor including an endless conveyor and a member arranged to form a bale former and support therebetween from which a bale can be bodily removed at any time, said endless conveyor deriving power from the power device, a bat guide adapted to deliver the bat to the bale former in one position or, alternately, to the endless conveyor, and means for controlling the direction of travel of the conveyor, which, when moved into one position causes the delivery of the bat to the accumulator and causes taking up action of the accumulator, and when moved to another position, causes both the bat guide and conveyor to feed to the bale former.

9. In a device of the class described, the combination with a bat former, an accumulator having movable means to wind or unwind bat, power means for operating the accumulator, a lint slide, a bat chute movable to direct bat to the accumulator or to the bat former, a lever co-operating with the power device to reverse the direction of the movable accumulator means, a hook pivotally connected to said lever, a second lever for operating the bat chute and having a pin projecting therefrom and adapted to be releasably engaged by said hook regardless of the position of said first mentioned lever.

10. In a device of the class described, the combination with a bat former, an accumulator having moving parts, a lint slide, a bat chute movably associated therewith for directing bat to either the accumulator or bale former, power mechanism for the movable parts of the accumulator and including a pair of meshing gears, a reversing mechanism for the accumulator comprising a lever having a gear engageable with either of said first mentioned driving or power gears, means for transmitting movement from said lever gear to the movable parts of the accumulator, and means connecting said lever with said bat chute to shift the latter when the moving parts of the accumulator are reversed.

11. An accumulator comprising a stationary section having a plurality of baling rolls forming part of a baling chamber, drive means for said rolls, a movable section having driving means adapted to actuate the drive means of the stationary section when the movable section is moved into cooperative relation with the stationary section, and said movable section being adapted to be moved away from said stationary section to render the drive means for the rolls of the stationary section inactive and to discharge or receive remnant bales.

12. An accumulator comprising a stationary section having a plurality of baling rolls forming part of a baling chamber, a feed roller carried by said stationary section, a movable section having an endless conveyor adapted to cooperate with said feed roller when the two sections cooperate to form a baling chamber, means carried by said movable section for driving the said roller, and said movable section being adapted to be moved away from said stationary section to render said feed roller inoperative and to discharge or to receive remnant bales.

13. An accumulator comprising a stationary section having a plurality of baling rolls and a feeding roll, a movable section having an endless conveyor adapted to cooperate with said feeding roll when the two sections are arranged in cooperative relation, and said movable section having means for driving the baling rolls and the feeding roll when said sections cooperate, and said movable section being adapted to be moved away from the stationary section to render said baling rolls and feed roll inoperative and to discharge or to receive remnant bales.

14. An accumulator comprising a stationary section having baling rolls, a movable section including an endless conveyor adapted to be pivotally connected adjacent the throat of a bale former and adapted to be moved either to upwardly inclined relation to said former or to a position to cooperate with said stationary section, and said movable section having means to cooperate with said stationary section to form a baling chamber and cooperating with said endless conveyor to form a bale support when said movable section is disposed in said inclined relation.

15. An accumulator comprising a stationary section having baling rolls, a movable section including an endless conveyor and a roll support above the plane of the conveyor, said conveyor adapted to be pivotally connected adjacent the throat of a bale former and adapted to be moved either to upwardly inclined relation to said former or to a position to cooperate with said stationary section, and said movable section having means to cooperate with said stationary section to form a baling chamber and cooperating with said endless conveyor to form a bale support when the movable section is disposed in said inclined relation.

16. The combination with a bale former, a bat forming mechanism, an accumulator adapted to be operated continuously by said bat forming mechanism, a bat slide movable to direct the bat to either said former or said accumulator, a reversing mechanism for reversing the movement of the accumulator, and means connecting said reversing mechanism and said bat slide whereby the latter may be operated independently of or conjointly with said reversing mechanism.

17. The combination with a bale former, a bat forming mechanism, an accumulator adapted to be operated continuously by said bat forming mechanism, a bat slide movable to direct the bat to either said former or said accumulator, a crank for operating said slide, a reversing mechanism for reversing the movement of the accumulator and including an operating lever, and a hook detachably engaged with said crank whereby the bat slide may be operated independently of or conjointly with said reversing mechanism.

18. An accumulator for bale formers comprising relatively movable sections, one section having a latch and the other a keeper, and means for unlocking said latch from said keeper and for turning said latch to disengage it from said keeper.

19. An accumulator for bale formers comprising relatively movable sections, one of said sections having a keeper, said other section having an eccentric, a latch mounted upon said eccentric, and means cooperating with the latch to turn it after the eccentric has moved said latch.

20. An accumulator for bale formers comprising an elevated stationary section having a plurality of baling rolls arranged in an arc, a feeding roll carried by said section, drive means for said rolls, a movable section adapted to cooperate with said stationary section to form a baling chamber, said movable section having drive means adapted to be engaged with the drive means of the stationary section when the two sections are arranged in cooperative relation.

21. An accumulator for bale formers comprising a pair of relatively movable sections forming a baling chamber, baling instrumentalities carried by these sections, means for reversing the direction of movement of said baling instrumentalities, one of said sections being arranged to support a wound mass of material independently of the other section, said sections when arranged in cooperative relation being adapted to either wind or unwind material, and one of said sections being capable of movement to operate independently of the other section to either wind or unwind the material.

22. An accumulator for bale formers comprising a pair of relatively movable sections forming a baling chamber, inter-dependent baling instrumentalities carried by said sections, means for reversing the direction of movement of said baling instrumentalities, one of said sections being arranged to support a wound mass of material independently of the other section, said sections when arranged in cooperative relation causing the interengagement of said baling instrumentalities to either wind or unwind material, and one of said sections being capable of movement to disengage said baling instrumentalities and to operate independently of the other section to either wind or unwind the material.

23. An accumulator for bale formers comprising a pair of relatively movable sections each having independent rolls cooperating when the sections are arranged in cooperative relation to form a closed baling chamber, drive means for the rolls of one section to rotate the rolls in either direction, power transmission elements carried by the two sections and adapted to be engaged when the sections are in cooperative relation, whereby power from one section is transmitted to the rolls of the other section, and one of said sections being movable to disengage said power transmission elements to operate independently of the other section to either wind or unwind material.

24. An accumulator for bale formers comprising a pair of relatively movable sections each having a plurality of baling rolls adapted to cooperate in constituting a baling chamber when the sections are arranged in cooperative relation to either wind or unwind material, power transmission means for the rolls of each section, means for driving the rolls of one of said sections in either direction, the power transmission means of the rolls of one section serving to drive the power transmission means of the rolls of the other section when said sections are in said relationship, and one of said sections being movable to disconnect the power transmission means of the rolls of the two sections to render the rolls of one section inoperative while maintaining the rolls of the movable section operative to either wind or unwind material independently of the other section.

25. An accumulator for bale formers comprising a stationary section having baling rolls, a pivotally mounted section movable relatively to said stationary section and having a winding and unwinding instrumentality associated therewith to cooperate with the rolls of the stationary section for either winding or unwinding material when the sections are arranged in cooperative relation, and said pivoted section being capable of movement away from said stationary section to a position to operate independently of the stationary section to either wind or unwind material.

26. An accumulator for bale formers comprising a stationary section, a movable section adapted to move toward said stationary section into cooperative relation therewith and away from the same and having means to independently support and wind or unwind material, said sections when arranged in cooperative relation being adapted to cooperate to either wind or unwind material, and said movable section being capable of movement away from the stationary section to operate independently of the stationary section to either wind or unwind material.

27. An accumulator for bale formers comprising a baling chamber consisting of a pair of sections adapted to cooperate to either wind or unwind material, one of said sections being movable and having means for rotating a roll of material while retaining it on a fixed axis independently of the other section.

28. An accumulator for bale formers comprising an elevated stationary section, a movable section adapted to move to the floor, said sections when arranged in cooperative relation being adapted to cooperate to either wind or unwind material, said movable section comprising an elongated frame having an angularly disposed end equipped with roll supporting means, and an endless conveyor mounted in said movable section and cooperating with said roll for rotating a roll of material while retaining it on a fixed axis independently of said stationary section.

29. An accumulator for bale formers comprising an elevated stationary section having a series of baling rolls arranged in an arc opening downwardly, a movable section adapted to move to the floor, and said movable section having a baling instrumentality arranged so as to form a substantially round baling chamber with the rolls of the stationary section when the two sections are arranged in cooperative relationship, and to rotate a roll of material while retaining it on a fixed axis independently of the stationary section.

30. In a device of the class described, a tower for a condensing apparatus, an accumulator including a stationary elevated section, means for supporting said stationary section from said tower and in elevated position, a series of baling rolls arranged in an arc in said stationary section and opening downwardly, and said accumulator including a movable section having a baling instrumentality adapted to cooperate with the rolls of said stationary section to either wind or unwind material and to operate independently of the rolls of the stationary section to either wind or unwind material.

31. In a device of the class described, a tower for a condensing apparatus, an accumulator including a stationary elevated section, means for supporting said stationary section from said tower and in elevated position, a series of baling rolls arranged in an arc in said stationary section, and opening downwardly, said accumulator including a movable section comprising a frame pivotally connected at one end to said tower and having an angular extension at its opposite end, a baling instrumentality carried by said movable section, and adapted to form a substantially cylindrical baling chamber with the rolls of the stationary section when arranged in cooperative relation to the latter, and said movable section being adapted to swing away from said stationary section and operate independently thereof to either wind or unwind material.

32. In a device of the class described, a tower for a condensing apparatus, an accumulator including a stationary elevated section, means for supporting said stationary section from said tower and in elevated position, a series of baling rolls arranged in an arc in said stationary section, and opening downwardly, said accumulator including a movable section comprising a frame pivotally connected at one end to said tower and having an angular extension at its opposite end, a reversible endless apron carried by said movable frame, a pair of rolls journalled in the angular portion of said frame, said reversible apron and rolls of the movable frame being adapted to cooperate with the rolls of the stationary frame to form a substantially cylindrical baling chamber operable to either wind or unwind material, and said movable section being adapted to be swung about its pivot below said stationary section, and being operable independently of the rolls of the stationary section to either wind or unwind material.

33. The combination with a baling press, of an accumulator therefor including a baling chamber, a reversible endless conveyor for moving material to the accumulator in one direction of movement of the conveyor and from said accumulator to the press in the opposite direction of movement of the conveyor.

34. An accumulator comprising a stationary section having normally idle baling rolls, a movable section adapted to be moved to cooperate with said stationary section to form a baling chamber, said movable section having means for driving said baling rolls when moved into cooperative relation with said stationary section, and said movable section being adapted to be moved away from said stationary section to disengage said driving means from said baling rolls to discharge or receive remnant bales.

In testimony whereof I have hereunto set my hand.

ALEXANDER S. MACKENZIE.